Sept. 24, 1963  W. E. CALLISON  3,104,577
TRIMMING DIE
Filed June 29, 1960
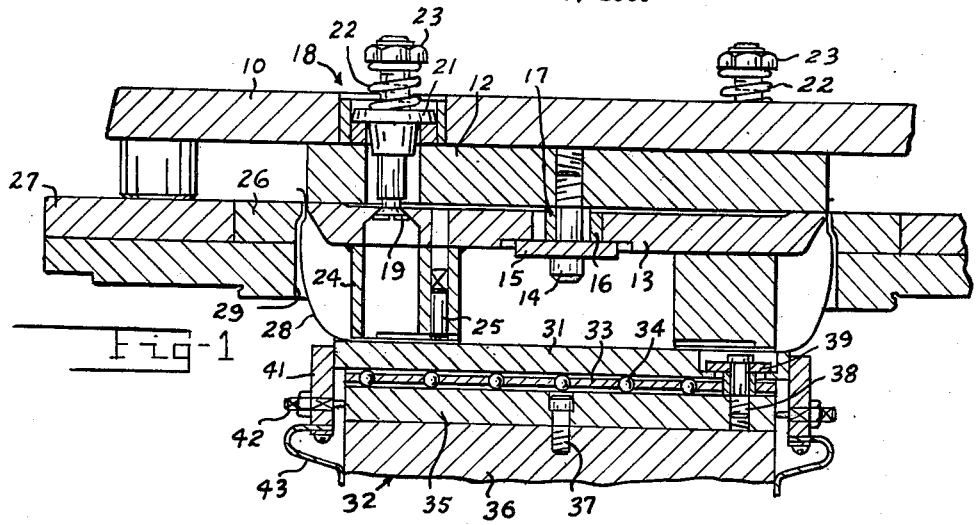
Fig-1
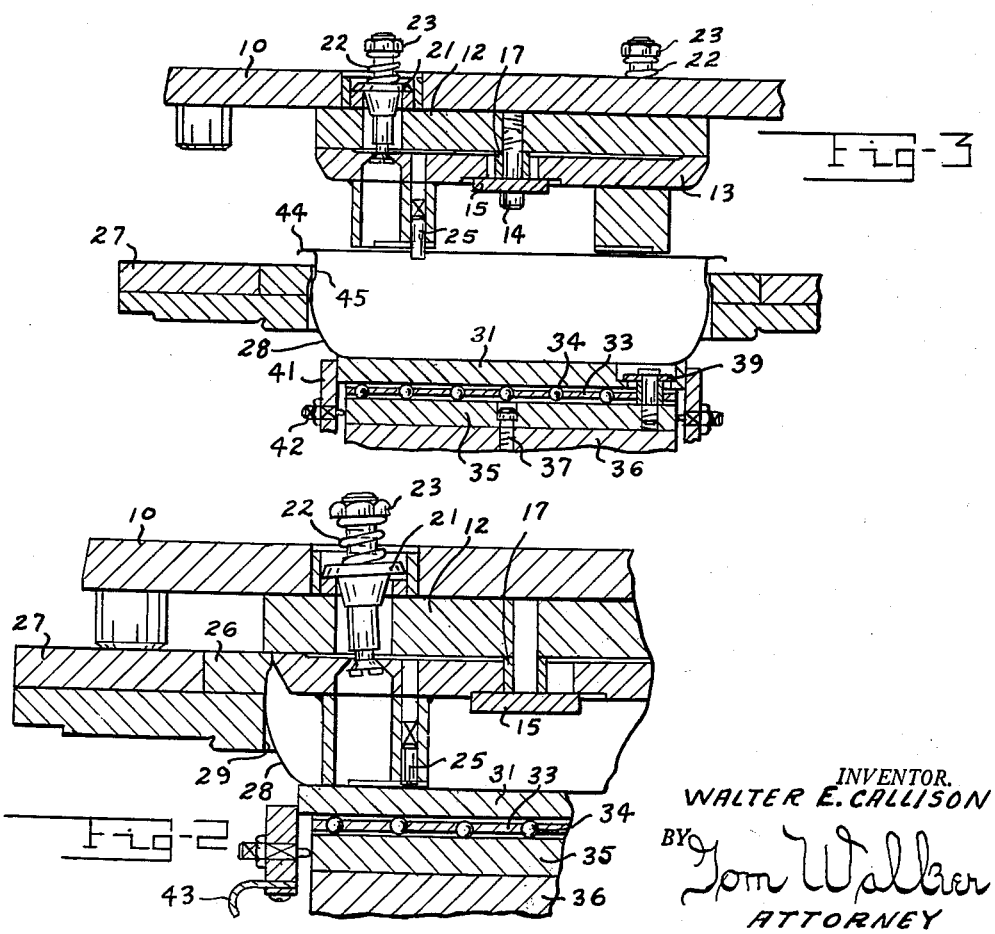
Fig-3
Fig-2
INVENTOR.
WALTER E. CALLISON
BY Tom Walker
ATTORNEY

United States Patent Office 3,104,577
Patented Sept. 24, 1963

3,104,577
TRIMMING DIE
Walter E. Callison, Dayton, Ohio, assignor to The Vulcan Tool Company, Dayton, Ohio, a corporation of Ohio
Filed June 29, 1960, Ser. No. 39,554
8 Claims. (Cl. 83—182)

This invention relates to apparatus for trimming shells and the like, having particular reference to apparatus utilizing relative transverse or lateral motion between complementary opposing cutter members to shear off or trim the end of a blank of shell-like configuration.

Apparatus of this general character is shown in Brehm Patent Number 2,347,808 and Brehm Patent Number 2,862,553.

The object of the invention is to simplify the construction as well as the means and mode of operation of trimming apparatus, whereby such apparatus may not only be economically manufactured, but will be more efficient and satisfactory in use, adaptable to a wide variety of application, and be unlikely to get out of order.

A further object of the invention has in view the improvement of the apparatus of these prior disclosures to the end that they may operate with increased accuracy and effectiveness upon shells to be trimmed at locations of reduced diameter.

Another object of the invention is to provide for lost motion in a punch and die or cutter assembly as described without premature displacement of the shell to be trimmed.

A further object of the invention is to provide a universally movable freely sliding support table to serve as a mount for a shell to be trimmed, such table moving only in conjunction with the movement of the shell to trim the end thereof.

A further object of the invention is to provide an apparatus possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in longitudinal section through trimming apparatus in accordance with the illustrated embodiment of the invention, showing a shell in place for trimming and a longitudinally adjustable die or cutter member positioned in an initial phase of a trimming operation;

FIG. 2 is a detail view like FIG. 1, showing the parts as they appear after actuation of the transversely movable cutter member; and FIG. 3 is a view similar to FIG. 1, showing the parts as they appear in a normal position prior to the initiation of a trimming operation.

Like parts are indicated by similar characters of reference throughout the several views.

In its illustrative embodiment the invention forms a part of a shell trimmer as disclosed in the aforementioned Brehm Patent Number 2,862,553. Accordingly the main framing of the device, the controls and the means to effect motion of the complementary cutter members are not disclosed herein and may be considered to be the same as or substantially like corresponding means of the patent, with the instant disclosure being limited to improvements contemplated by this invention.

Thus, the main frame of the machine provides a means to guide a plate 10 in a vertical reciprocating motion. On the underside thereof is secured a punch 12. Beneath the assembly comprising part 10 and punch 12 is a gage member 13 which is held to the part 12 by a stud 14 and washer 15 and which is in retaining relation to the punch 12. An oversize opening 16 in the gage 13 provides for passage of the stud 14 therethrough and for reception of a bushing 17 therein while permitting relative lateral or transverse movement of the gage. The gage 13 further is held to the punch 12 and to the plate 10 by a plurality of spring connectors 18, each including a conical foot 19 received in the gage 13, a sleeve 21 extending through the punch 12 and based in the plate 10 and a spring 22 placed under compression by a nut 23. The arrangement is one in which the connectors 18 tend to align the gage 13 with the punch 12 and further wherein they will yield to allow a lateral displacement of the gage, and, when the impulse effecting such displacement is removed, will return the gage to its normal aligned position.

In downwardly projecting relation to the gage 13, and connected thereto to form a part thereof, are fingers 24. A spring pressed plunger 25 is adapted to project from the bottom of each finger 24 to serve a seal breaking function which will more clearly appear hereinafter.

The outer periphery of the punch 12 provides a sharp edged surface defining one of the complementary cutter elements. The other is represented by the inner periphery of a die element 26 which is comprised in and forms a part of a transversely movable assembly 27. Lying in a plane immediately beneath the plane of punch 12, a transverse movement of the cutter element 26 which causes it to pass through the vertical plane of the outer periphery of the punch will effect a cutting or trimming action upon interposed material. The assembly 27 is, in trimming apparatus of the kind to which this invention is particularly adapted, put through a series of transverse movements in a single trimming operation, such movements being in a common plane but in different directions to achieve complete trimming of an interposed continuous shell end.

As indicated, the trimming apparatus is adapted to work upon a cupped shell 28, which, when installed for trimming, is received in an opening 29 in the assembly 27. The shell is mounted in the apparatus with its open end facing upward or in a direction to receive the punch 12 and gage 13 thereon. The closed lower end of the shell is adapted to seat on a table 31 which in turn is mounted upon a movable base 32 through a plate 33 mounting freely rolling balls 34. The table 31 is thus mounted to the base 32 for universal relative sliding motion, being freely movable in a plane parallel to the cutter element 26 in a plurality of directions corresponding to the operating movement of member 26.

The base 32 is made up of base members 35 and 36 interconnected by stud means 37. The table 31 is connected to the base assembly for unison bodily motion in a vertical sense and limited relative lateral motion through studs 38 and bushings 39 received in aligned openings in the table and in the ball carrying plate 33. The table 31 has downwardly extending flange portions 41 secured thereto and these in turn carry spring pressed plungers 42 adapted to engage the sides of base 32 and so effect a centering action upon the table 31. Flexible covers 43 are mounted to exclude dirt and foreign particles from the bearing plate 33.

As installed in the apparatus, the shell 28 has an integral portion 44 projecting upward out of the opening 29 in overlapping relation to the cutting edges on the cutter members 12 and 26. Further, the shell is formed with a reduced diameter neck portion 45 and the height of the fingers 24 are predetermined in order to laterally align the trim point of the reduced diameter portion 45 of the shell with the cutting edge of cutter element 26. The smallest diameter of the opening 29 is required to be sufficiently large to accept the maximum diameter of the shell. Accordingly, when installed the shell is not gripped or held within the opening 29 but is permitted limited transverse motion relative thereto.

In the operation of the apparatus, after installation of the shell as shown in FIG. 3, the plate member 10 is lowered. In the course of such movement the tapered lower end of the gage 13 enters the shell and tends to center it within opening 29 and with respect to the punch 12, this centering motion terminating in a positive locating of the shell as the cylindrical portion of the periphery of the gage 13 reaches cooperative engagement with the reduced neck 45 of the shell in the plane of the laterally movable cutter element 26. At about this same time the lower ends of the fingers 24 reach engagement with the bottom of the shell and press it firmly to a seat on the table 31, the plungers 25 being displaced inwardly in response to such movement.

Following this initial phase of the operation, the assembly 27 is moved transversely to begin its series of trimming operations and the outer cutter element 26 is caused thereby to approach the shell 28, such approaching motion being accomplished relatively to the shell and to the table 31 upon which it rests. In response to a continued transverse movement of the cutter member 26, the engaged shell and the gage 13 are moved or displaced in a lateral sense relative to the punch 12 with the result that the upwardly projecting portion 44 of the shell, or a part thereof, is trimmed or sheared from the main body of the shell.

This movement of the parts, resulting in a positioning thereof as shown in FIG. 2, is accompanied by a movement of the table 31, which, since it is frictionally engaged with the shell 28, moves with the shell to maintain it in the same relative position throughout its movements of lateral displacement as effected by the cutter member 26. As the assembly 27 is allowed to return to a normal position the spring connector 18 restore the gage 13 to a central position tending thereby also to center the shell 28 and table 31, repositioning of the latter being assisted by the spring pressed plungers 42. In response to a rising or retracting movement of the plate 10, the gage member 13 is lifted to release the shell and the fingers 24 are withdrawn from contact with the bottom thereof, the plungers 25 acting as ejectors to preclude a following motion of the shell.

From the above description it will be apparent that there is thus provided a device of the character described possessing the particular features of advantage before enumerated as desirable, but which obviously is susceptible of modification in its form, proportions, detail of construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for trimming shells at a location of reduced diameter thereon, including a longitudinally movable inner cutter member adapted to be received in one end of the shell in interfitting relation thereto, a guide member on said inner cutter member connected thereto for unison longitudinal and relative lateral motion, said guide member being adapted to be received in interfitting relation with the reduced diameter portion of the shell, dependent fingers on said guide portion adapted to engage the opposite end of the shell, said opposite end being closed, a table mounting independent of said cutter members to which said shell is seated by pressure of said finger means in response to longitudinal motion of said inner cutter member into the said one end of said shell, base means for said table including rolling means providing for universal independent sliding motion of said table on said base means, yielding means interposed between said table and base means tending to align said table with said inner cutter, and a transversely movable outer cutter member independent of said table having an opening receiving said shell and of a diameter to pass the maximum shell diameter, said shell being trimmed by a longitudinal positioning of said inner cutter member within the shell followed by a transverse movement of said outer cutter member, said table positioning the shell to locate the reduced diameter portion thereof in the path of movement of said outer cutter, said cutter moving relative to said shell in a first part of the operation thereof to engage the shell and subsequently displacing the shell laterally relative to said inner cutter member for trimming, said table providing for anti-friction movement of said shell on said base means.

2. Apparatus for trimming a shell closed at one end and open at the other, said shell having portions of greater and lesser diameter, including an outer cutter member having an opening receiving the shell and of a size to pass the shell portion of greater diameter, base means including a table aligned with said opening and freely movable in a lateral sense independently of said outer cutter member, said outer cutter member being movable in a plane parallel to said table, the shell being received in said opening with its closed end foremost and limiting against said table, said table locating the shell with a portion of lesser diameter laterally aligned with said outer cutter member, and inner cutter means longitudinally movable relative to said outer cutter member and including fingers adapted to engage the inner closed end of the shell and press it to a seat on said table and further including a gage adapted to enter the open end of the shell and center the shell relative to said opening in said outer cutter member, said inner cutter member still further including a punch cooperable with said outer cutter member to trim the shell in response to relative lateral motion of said outer cutter member, such motion comprising a first phase in which said outer cutter member moves to engage said shell and a second phase in which said shell is displaced laterally relative to said punch.

3. Apparatus for trimming shells at a location of reduced diameter thereon, including a longitudinally movable inner cutter member adapted to be received in an interfitting relation to a shell at one end thereof, a transversely movable outer cutter member having an opening receiving said shell, which opening is of a diameter to pass the maximum shell diameter, a table for supporting said shell independent of said cutter members to locate the reduced portion of the shell in the path of movement of said outer cutter member, said inner cutter member being movable to clamp said shell to said table independent of said outer cutter member, the clamping portion thereof being movable relative said inner cutter member in a lateral sense, and means mounting said table for a free sliding movement thereon to accommodate movement of said table independent of or relative the movement of said outer cutter member.

4. Apparatus for trimming shells, including a pair of cutter members arranged respectively for axial reciprocating movement and for transverse movement, said axial movable cutter member adapted to be received in one end of the shell, said transversely movable cutter member having a through opening therein to receive the shell to be trimmed by cutting engagement between the cutter members, there being clearance between said transversely movable cutter member and shell, said shell being installed in said opening with one end facing said axially movable cutter, a shell holder independent of said transversely movable cutter member arranged to support the shell at its opposite end, said shell holder positioning the shell to locate the reduced diameter portion thereof in the path of movement of said transversely movable cutter member, means independent of said transversely movable cutter member providing a base for said shell holder and means mounting said shell holder to said base providing for a free sliding motion of said shell holder thereon and relative said cutter members.

5. Apparatus for trimming a shell of varying diameter, including a pair of cutter members arranged for respectively for axial reciprocating movement and for transverse movement, said transversely movable cutter having an opening therein to receive the shell to be trimmed, said opening having a diameter to accept the largest diameter of the shell, said axially movable cutter member being received in said shell to center it in said opening, the shell being trimmed between the co-acting faces when the respective cutter members are brought together, a table supporting said shell independent of said transversely moving cutter member, and means providing a base for said table which is independent of said transversely movable cutter member accommodating a relative free sliding motion of said table thereon relative said transversely movable cutter member.

6. Apparatus according to claim 5, characterized by means providing an operative connection between said table and said base tending yieldingly to center said table relative to said opening.

7. Apparatus according to claim 5, characterized by finger means on said axially movable cutter member engageable with the inner end of said shell to seat said shell on said table.

8. Apparatus for trimming shells which are open at one end and closed at the other end including a pair of cutter members arranged respectively for axial reciprocating movement and transverse movement, said transversely movable cutter member having a through opening therein to receive the shell to be trimmed with clearance therebetween, said shell being installed in said opening with its open end facing said axially movable cutter member, said axially movable cutter member being movable into the open end of the shell, a shell holder supporting the closed end of said shell independent of said cutter members, said shell holder positioning the shell in relation to its contact between the cutter members, a base for said shell holder, and means therebetween providing for a relative universal sliding motion of said holder on said base in a lateral sense and independent and in absence of movement of said transversely movable cutter member.

References Cited in the file of this patent
UNITED STATES PATENTS

| | | |
|---|---|---|
| 1,396,230 | Peterson | Nov. 8, 1921 |
| 1,420,468 | Brehm | June 20, 1922 |
| 2,212,874 | Brehm | Aug. 27, 1940 |
| 2,526,163 | Shippy | Oct. 17, 1950 |
| 2,669,302 | Brehm | Feb. 16, 1954 |
| 2,862,553 | Brehm | Dec. 2, 1958 |